United States Patent
Praisner et al.

(10) Patent No.: US 8,424,313 B1
(45) Date of Patent: Apr. 23, 2013

(54) GAS TURBINE ENGINE MID TURBINE FRAME WITH FLOW TURNING FEATURES

(75) Inventors: Thomas J. Praisner, Colchester, CT (US); Shankar S. Magge, South Windsor, CT (US); Matthew B. Estes, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/369,366

(22) Filed: Feb. 9, 2012

Related U.S. Application Data

(60) Provisional application No. 61/593,162, filed on Jan. 31, 2012.

(51) Int. Cl.
*F02D 9/02* (2006.01)

(52) U.S. Cl.
USPC .............................................. 60/796; 415/191

(58) Field of Classification Search .................... 60/796, 60/805; 415/191, 211.2; 416/241 R
See application file for complete search history.

(56) References Cited

U.S. PATENT DOCUMENTS

| | | | |
|---|---|---|---|
| 3,475,107 A * | 10/1969 | Auxier | 415/115 |
| 4,722,184 A | 2/1988 | Chaplin et al. | |
| 5,894,721 A | 4/1999 | Hanson | |
| 6,234,754 B1 | 5/2001 | Zelesky et al. | |
| 6,254,333 B1 | 7/2001 | Merry | |
| 6,312,219 B1 * | 11/2001 | Wood et al. | 415/191 |
| 6,375,419 B1 * | 4/2002 | LeJambre et al. | 415/191 |
| 6,755,612 B2 | 6/2004 | Shahpar et al. | |
| 7,094,027 B2 * | 8/2006 | Turner et al. | 415/194 |
| 7,510,371 B2 * | 3/2009 | Orlando et al. | 415/191 |
| 7,648,334 B2 | 1/2010 | Hurst et al. | |
| 7,694,505 B2 | 4/2010 | Schilling | |
| 7,722,329 B2 | 5/2010 | Clarke | |
| 7,850,428 B2 | 12/2010 | Tibbott et al. | |
| 7,934,900 B1 | 5/2011 | Pask | |
| 8,075,259 B2 | 12/2011 | Praisner et al. | |
| 2008/0056896 A1 * | 3/2008 | Trindade et al. | 415/208.1 |
| 2010/0135770 A1 * | 6/2010 | Durocher et al. | 415/69 |
| 2010/0209238 A1 * | 8/2010 | Praisner et al. | 415/208.2 |

OTHER PUBLICATIONS

Gunston, Bill, "Jane's Aero-Engines," Issue Seven, 2000, pp. 510-512.

* cited by examiner

*Primary Examiner* — Phutthiwat Wongwian
(74) *Attorney, Agent, or Firm* — Carlson, Gaskey & Olds P.C.

(57) ABSTRACT

A gas turbine engine includes first and second stages having a rotational axis. A mid turbine frame is arranged axially between the first and second stages. The mid turbine frame includes a circumferential array of airfoils, and the airfoils each have a curvature provided equidistantly between pressure and suction sides. The airfoils extend from a leading edge to a trailing edge at a midspan plane along the airfoil. An angle is defined between first and second lines respectively tangent to the intersection of the plane and the curvature at airfoil leading and trailing edges. The angle is equal to or greater than about 10°, for example. In one example, an airfoil aspect ratio is less than 1.5.

26 Claims, 3 Drawing Sheets

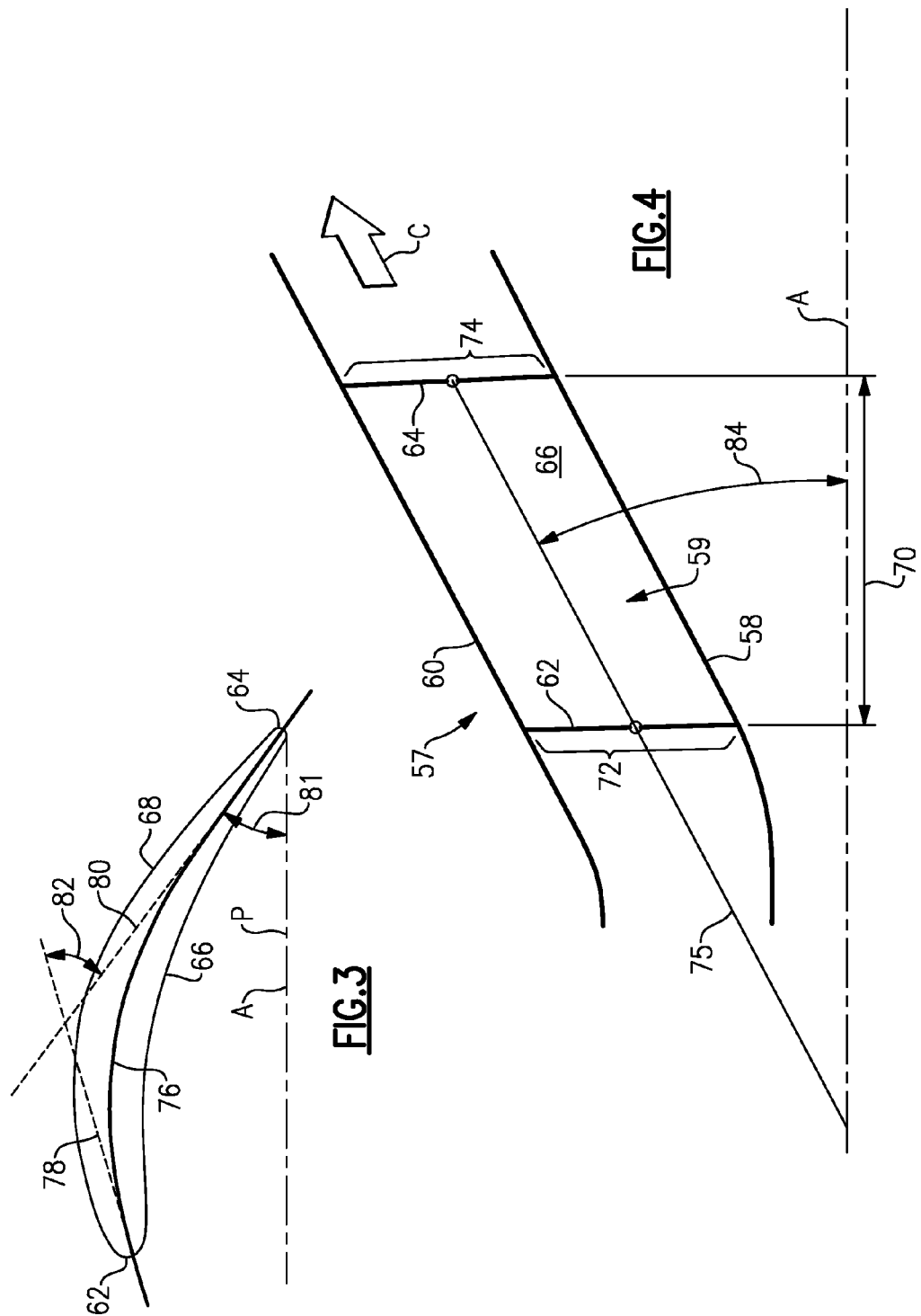

GAS TURBINE ENGINE MID TURBINE FRAME WITH FLOW TURNING FEATURES

This application claims priority to U.S. Provisional Application No. 61/593,162, which was filed on Jan. 31, 2012.

BACKGROUND

This disclosure relates to a gas turbine engine mid turbine frame with flow turning features.

One typical gas turbine engine includes multiple, nested coaxial spools. A low pressure turbine is mounted to a first spool, and a high pressure turbine is mounted to a second spool. A mid turbine frame is arranged axially between the low pressure turbine and the high pressure turbine. One example mid turbine frame includes first and second circumferential arrays of turbine vanes adjoining radially spaced outer and inner cases. The first and second array of vanes are axially spaced from one another. Oil and air may be passed through the airfoils.

SUMMARY

A gas turbine engine includes first and second stages having a rotational axis. A mid turbine frame is arranged axially between the first and second stages. The mid turbine frame includes a circumferential array of airfoils, and the airfoils each have a curvature provided equidistantly between pressure and suction sides. The airfoils extend from a leading edge to a trailing edge at a midspan plane along the airfoil. An angle is defined between first and second lines respectively tangent to the intersection of the plane and the curvature at airfoil leading and trailing edges. The angle is equal to or greater than about 10°.

In a further embodiment of any of the above, the midspan plane is oriented at a flow path angle relative to the rotational axis in the range of 20°-60°.

In a further embodiment of any of the above, the mid turbine frame includes inner and outer cases joined by the airfoils. The leading and trailing edges respectively extend in a radial direction from the inner and outer case a leading edge span and a trailing edge span. The airfoil extends in an axial direction an axial chord length between the leading and trailing edges. The airfoils each have an aspect ratio of less than 1.5, wherein the aspect ratio is an average of the sum of the leading and trailing edge spans divided by the axial chord length.

In a further embodiment of any of the above, the low and high pressure turbines are configured to rotate in opposite directions.

In a further embodiment of any of the above, the first angle is greater than 20°.

In a further embodiment of any of the above, the array includes twenty or fewer airfoils.

In a further embodiment of any of the above, the gas turbine engine includes a compressor section having a high pressure compressor and a low pressure compressor. A combustor is fluidly connected to the compressor section, and a turbine section is fluidly connected to the combustor. The turbine section includes a high pressure turbine that provides the first stage. A low pressure turbine provides the second stage. A mid-turbine frame provides the frame positioned between the high pressure turbine and the low pressure turbine.

In another further embodiment of any of the foregoing gas turbine engine embodiments, a fan is fluidly connected to the compressor section.

In another further embodiment of any of the foregoing gas turbine engine embodiments, a geared architecture is interconnected between the fan and the low pressure turbine.

In another further embodiment of any of the foregoing gas turbine engine embodiments, the gas turbine engine may be a high bypass geared aircraft engine having a bypass ratio of greater than about six (6).

In another further embodiment of any of the foregoing gas turbine engine embodiments, the gas turbine engine may include a low Fan Pressure Ratio of less than about 1.45.

In another further embodiment of any of the foregoing gas turbine engine embodiments, the low pressure turbine may have a pressure ratio that is greater than about 5.

A gas turbine engine includes low and high pressure turbines that have a rotational axis. A mid turbine frame is arranged axially between low and high pressure turbines. The mid turbine frame includes a circumferential array of airfoils. The mid turbine frame includes inner and outer cases joined by the airfoils. Leading and trailing edges respectively extend in a radial direction from the inner and outer case a leading edge span and a trailing edge span. The airfoil extends in an axial direction an axial chord length between the leading and trailing edges. The airfoils each have an aspect ratio range of greater than 1.0 to about 1.5, wherein the aspect ratio is an average of the sum of the leading and trailing edge spans divided by the axial chord length.

In a further embodiment of any of the above, the airfoils each have a curvature provided equidistantly between pressure and suction sides and extend from the leading edge to the trailing edge at a midspan plane along the airfoil. A plane extends through the rotational axis and intersects the trailing edge and curvature. First and second lines are respectively tangent to the curvature at the leading and trailing edges. A first angle is provided between the plane and the second line and a second angle is provided between the second and first lines, wherein the second angle is greater than 10°.

In a further embodiment of any of the above, the midspan plane is oriented at a flow path angle relative to the rotational axis in the range of 20°-60°.

In a further embodiment of any of the above, the low and high pressure turbines are configured to rotate in opposite directions.

In a further embodiment of any of the above, the first angle is greater than 20°.

In a further embodiment of any of the above, the array includes twenty or fewer airfoils.

In a further embodiment of any of the above, the gas turbine engine includes a compressor section fluidly having a high pressure compressor and a low pressure compressor. A combustor is fluidly connected to the compressor section, and a turbine section is fluidly connected to the combustor. The turbine section includes a high pressure turbine that provides the first stage. A low pressure turbine provides the second stage. A mid-turbine frame provides the frame positioned between the high pressure turbine and the low pressure turbine.

In another further embodiment of any of the foregoing gas turbine engine embodiments, the gas turbine engine may be a high bypass geared aircraft engine having a bypass ratio of greater than about six (6).

In another further embodiment of any of the foregoing gas turbine engine embodiments, the gas turbine engine may include a low Fan Pressure Ratio of less than about 1.45.

In another further embodiment of any of the foregoing gas turbine engine embodiments, the low pressure turbine may have a pressure ratio that is greater than about 5.

BRIEF DESCRIPTION OF THE DRAWINGS

The disclosure can be further understood by reference to the following detailed description when considered in connection with the accompanying drawings wherein:

FIG. 3 is a cross-sectional view through a midspan plane of an airfoil shown in FIG. 4.

FIG. 4 is a schematic side view of an airfoil in the mid turbine frame.

DETAILED DESCRIPTION

Figure 1:
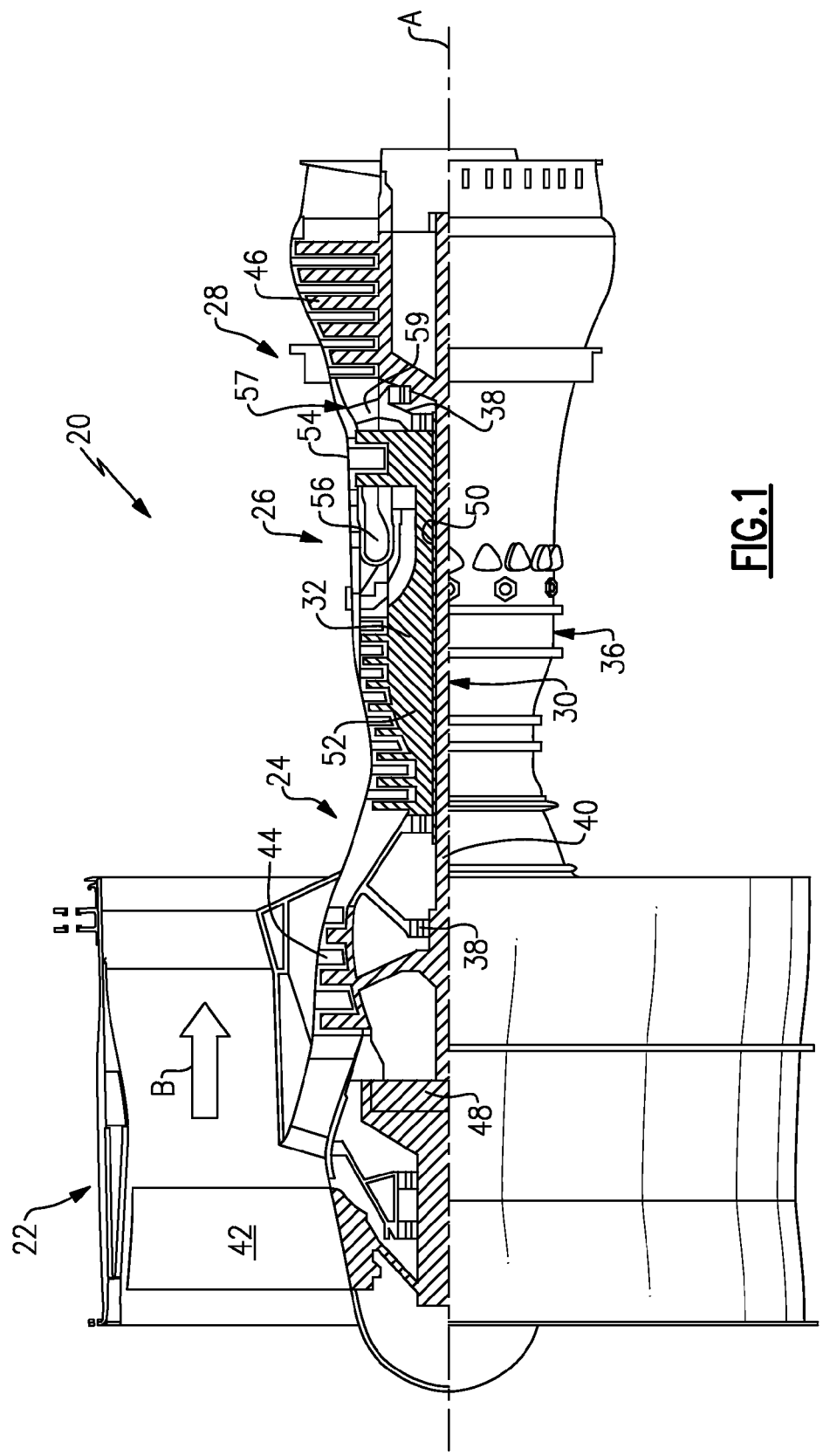
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation in opposite direction relative to one another about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 directly or through a geared architecture 48 to drive the fan 42 at a lower speed than the low speed spool 30. The high speed spool 32 includes an outer shaft 50 that interconnects a high pressure compressor 52 and a high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54, the mid-turbine frame 57, and low pressure turbine 46. The mid-turbine frame 57 includes circumferential array of airfoils 59, which are arranged in the core airflow path axially between the low and high pressure turbines 46, 54. In one example, there are twenty or fewer airfoils arranged in a single axial row circumferentially along the mid turbine frame flow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned per hour divided by 1 bf of thrust the engine produces at that minimum point. "Fan pressure ratio" is the pressure ratio across the fan blade alone, without a Fan Exit Guide Vane ("FEGV") system. The fan pressure ratio as disclosed herein according to one non-limiting embodiment is less than about 1.45. "Low corrected fan tip speed" is the actual fan tip speed in ft/sec divided by an industry standard temperature correction of $[(Tambient\ deg\ R)/518.7)^\wedge 0.5]$. The "Low corrected fan tip speed," as disclosed herein according to one non-limiting embodiment, is less than about 1150 ft/second.

Figure 2B:
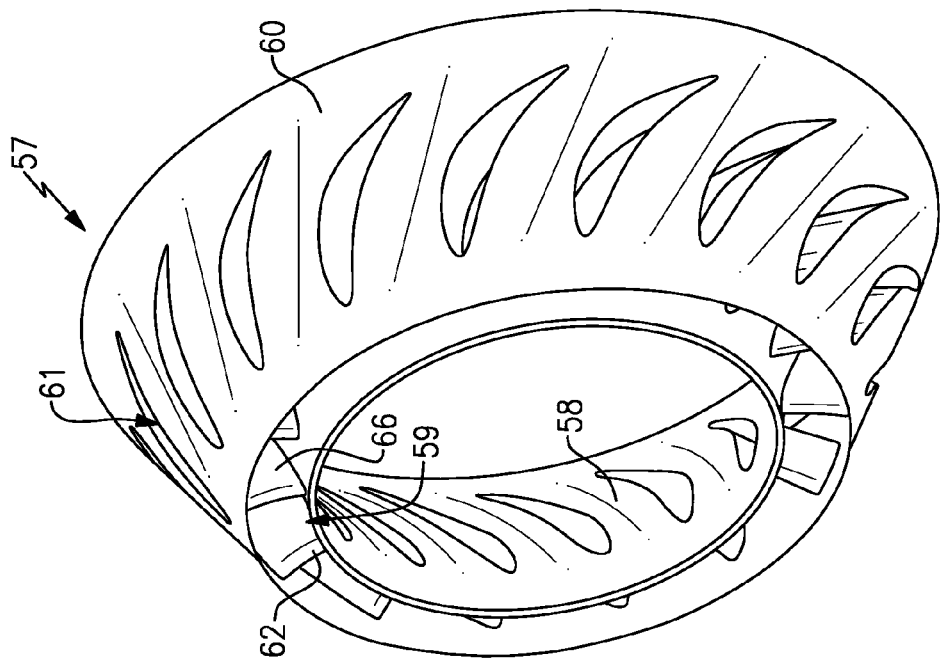
FIG. 2B is a side perspective view of the mid turbine frame illustrated in FIG. 2A.
Figure 2A:
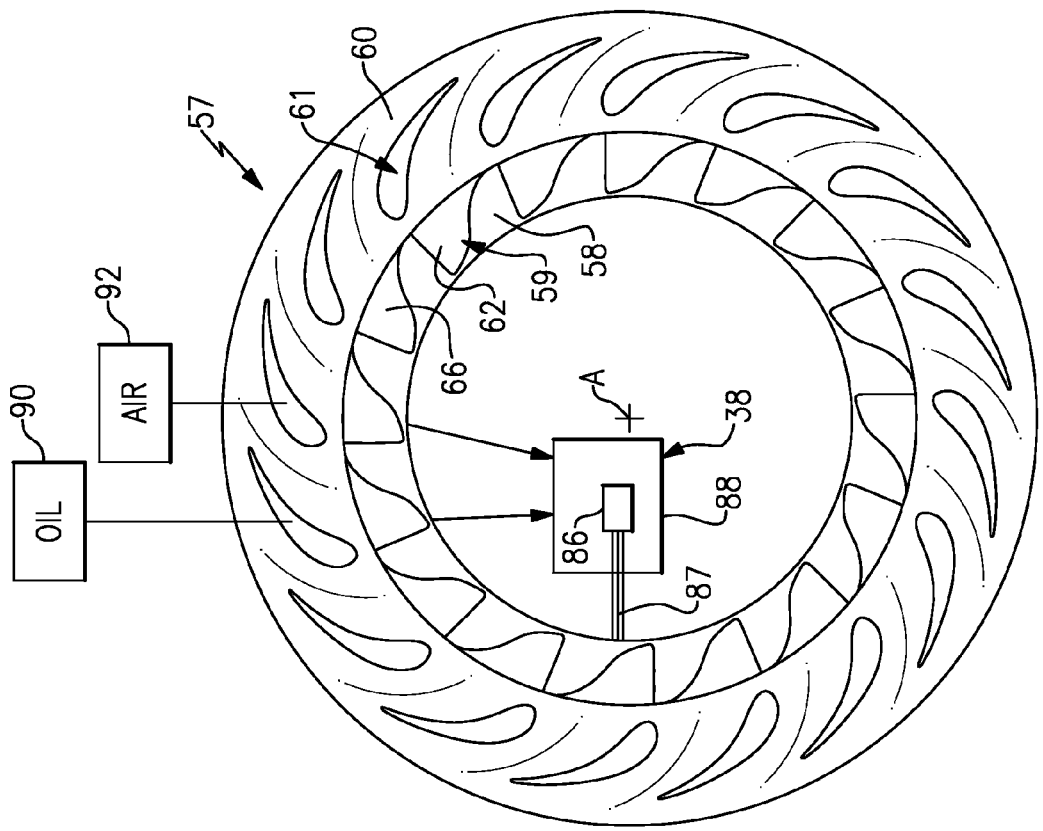
FIG. 2A is a front elevational view of an example mid turbine frame schematically depicting a bearing and oil and air sources.

Referring to FIGS. 2A and 2B, the mid turbine frame 57 includes inner and outer cases 58, 60 joined by the airfoils 59 to define a mid turbine frame flow path through which core airflow C passes. In one example, the airfoils 59 provide cavities 61 through which components and/or fluids may pass. For example, a structure support 87 may extend through the cavities 61 to support a bearing 86 arranged in a bearing compartment 88. The bearing 86 is part of a bearing system 38, which may support the high speed spool 32. An oil source 90 may communicate oil to the bearing compartment 88 through a cavity 88, and an air source 92 may supply air through a cavity 61 to buffer the bearing compartment 88.

Referring to FIGS. 3 and 4, with continuing reference to FIGS. 2A-2B, the airfoils 59 include circumferentially spaced pressure and suction sides 66, 68 extending somewhat axially between leading and trailing edges 62, 64. Each airfoil 59 has a curvature 76 provided equidistantly between pressure and suction sides 66, 68. The airfoils 59 extend from the leading edge 62 to the trailing edge 64 along a midspan plane 75. In one example, the midspan plane 75 is oriented at a flow path angle 84 relative to the rotational axis A in the range of 20°-60°

The airfoils 59 have a camber that induces a turning airflow as the air passes through the mid turbine frame 57 between the counter rotating first and second stages, such as high and low pressure turbines 54, 46. It should be understood that the airfoils 59 may also be used between other sets of rotating stages. A plane P extends through the rotational axis A and intersects the trailing edge 64 and curvature 76. First and second lines 78, 80 are respectively tangent to the curvature 76 at the leading and trailing edges 62, 64. A first angle 81 is provided between the plane P and the second line 80, and a second angle 82 is provided between the second and first lines 80, 78. In one example, the first angle 81 is in a range of 0°-70°, and the second angle 82 is greater than 10°. It should be understood that the first angle may have other values outside the range and still fall within the scope of this disclosure.

Referring to FIG. 4, the leading and trailing edges 62, 64 respectively extend in a generally radial direction from the inner and outer cases 58, 60 a leading edge span 72 and a trailing edge span 74. The airfoil 59 extends in an axial direction an axial chord length 70 between the leading and trailing edges 62, 64. The airfoils 59 each have an aspect ratio of less than 1.5, wherein the aspect ratio is an average of the sum of the leading and trailing edge spans 72, 74 divided by the axial chord length 70. In one example, the aspect ratio has a range of greater than 1.0 to about 1.5.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
a first stage and a second stage having a rotational axis;
a frame arranged axially between the first stage and the second stage, the frame including a circumferential array of airfoils, at least one of the airfoils having a curvature provided equidistantly between pressure and suction sides and extending from a leading edge to a trailing edge at a midspan plane along the airfoil, and an angle defined between first and second lines respectively tangent to the intersection of the midspan plane and the curvature at the airfoil leading and trailing edges, the angle being equal to or greater than about 10°.

2. The gas turbine engine according to claim 1, wherein the midspan plane is oriented at a flow path angle relative to the rotational axis in a range of 20°-60°.

3. The gas turbine engine according to claim 1, wherein the frame includes an inner and an outer case joined by the airfoils, the leading and trailing edges respectively extending in a generally radial direction from the inner case and the outer case a leading edge span and a trailing edge span, and the airfoil extends in an axial direction an axial chord length between the leading and trailing edges, the at least one of airfoils having an aspect ratio of less than 1.5, wherein the aspect ratio is an average of the sum of the leading and trailing edge spans divided by the axial chord length.

4. The gas turbine engine according to claim 1, wherein the first stage and the second stage are configured to rotate in opposite directions.

5. The gas turbine engine according to claim 1, wherein a rotational axis plane extends through the rotational axis and intersects the trailing edge and the curvature, a first angle provided between the rotational axis plane and the second line, the angle providing a second angle, and wherein the first angle is greater than 20°.

6. The gas turbine engine according to claim 1, wherein the array includes twenty or fewer airfoils.

7. The gas turbine engine according to claim 1, comprising:
a compressor section comprising a high pressure compressor and a low pressure compressor;
a combustor fluidly connected to the compressor section;
a turbine section fluidly connected to the combustor, the turbine section comprising:
the first stage is a high pressure turbine;
the second stage is a low pressure turbine; and
wherein the frame is provided by a mid-turbine frame positioned between the high pressure turbine and the low pressure turbine.

8. The gas turbine engine according to claim 7, further comprising a fan fluidly connected to the compressor section.

9. The gas turbine engine according to claim 8, comprising a geared architecture is interconnected between the fan and the low pressure turbine.

10. The gas turbine engine according to claim 8, wherein the gas turbine engine is a high bypass geared aircraft engine having a bypass ratio of greater than about six (6).

11. The gas turbine engine according to claim 8, wherein the gas turbine engine includes a Fan Pressure Ratio of less than about 1.45.

12. The gas turbine engine according to claim 8, wherein the low pressure turbine has a pressure ratio that is greater than about 5.

13. A gas turbine engine comprising:
a first stage and a second stage having a rotational axis;
a frame arranged axially between the first stage and the second stage, the frame including a circumferential array of airfoils, the frame includes inner and outer cases joined by the airfoils, leading and trailing edges respectively extending in a generally radial direction from the inner and outer cases a leading edge span and a trailing edge span, and the airfoil extends in an axial direction an axial chord length between the leading and trailing edges, the airfoils each having an aspect ratio range having a lower limit of greater than 1.0 to an upper limit of about 1.5, wherein the aspect ratio is an average of the sum of the leading and trailing edge spans divided by the axial chord length.

14. The gas turbine engine according to claim 13, the airfoils each having a curvature provided equidistantly between pressure and suction sides and extending from the leading edge to the trailing edge at a midspan plane along the airfoil, a rotational axis plane extending through the rotational axis and intersecting the trailing edge and the curvature, first and second lines respectively tangent to the curvature at the leading and trailing edges, a first angle provided between the rotational axis plane and the second line and a second angle provided between the second and first lines, wherein the second angle is greater than 10°.

15. The gas turbine engine according to claim 14, wherein the midspan plane is oriented at a flow path angle relative to the rotational axis in a range of 20°-60°.

16. The gas turbine engine according to claim 13, wherein the first stage and the second stage are configured to rotate in opposite directions.

17. The gas turbine engine according to claim 14, wherein the first angle is greater than 20°.

18. The gas turbine engine according to claim 13, wherein the array includes twenty or fewer airfoils.

19. The gas turbine engine according to claim 13, comprising:
a compressor section comprising a high pressure compressor and a low pressure compressor;
a combustor fluidly connected to the compressor section;

a turbine section fluidly connected to the combustor, the turbine section comprising:
the first stage is a high pressure turbine;
the second stage is a low pressure turbine; and
wherein the frame is provided by a mid-turbine frame positioned between the high pressure turbine and the low pressure turbine.

20. The gas turbine engine according to claim 19, wherein the gas turbine engine includes a fan and is a high bypass geared aircraft engine having a bypass ratio of greater than about six (6).

21. The gas turbine engine according to claim 20, wherein the gas turbine engine includes a Fan Pressure Ratio of less than about 1.45.

22. The gas turbine engine according to claim 19, wherein the low pressure turbine has a pressure ratio that is greater than about 5.

23. A mid turbine frame for a gas turbine engine, comprising:
a frame of the mid turbine frame including a circumferential array of airfoils, at least one of the airfoils having a curvature provided equidistantly between pressure and suction sides and extending from a leading edge to a trailing edge at a midspan plane along the airfoil, and an angle defined between first and second lines respectively tangent to the intersection of the midspan plane and the curvature at the airfoil leading and trailing edges, the angle being equal to or greater than about 10°.

24. A turbine section for a gas turbine engine, comprising:
a first turbine and a second turbine having a rotational axis;
a mid turbine frame arranged axially between the first turbine and the second turbine, a mid turbine frame including a circumferential array of airfoils, at least one of the airfoils having a curvature provided equidistantly between pressure and suction sides and extending from a leading edge to a trailing edge at a midspan plane along the airfoil, and an angle defined between first and second lines respectively tangent to the intersection of the midspan plane and the curvature at the airfoil leading and trailing edges, the angle being equal to or greater than about 10°.

25. The turbine section according to claim 24, wherein one of the first and second turbines is a low pressure turbine, the low pressure turbine has a pressure ratio that is greater than about 5.

26. The turbine section according to claim 24, wherein the array includes twenty or fewer airfoils.

* * * * *